2,904,442

MEAT TENDERIZER

Leland A. Underkofler, Woodcliff Lake, N.J., assignor to Miles Laboratories, Inc., Elkhart, Ind., a corporation of Indiana No Drawing. Application January 27, 1958
Serial No. 711,148

7 Claims. (Cl. 99—222)

This invention relates to meat tenderizing compositions and particularly to a combination of enzyme systems which has outstanding stability and outstanding utility for the tenderizing of animal tissues. Still more particularly, the invention relates to a composition comprising a mixture of two or more enzyme systems, each system having particular tenderizing effect and a diluent-stabilizer.

Briefly stated, the compositions of this invention comprise a mixture of two enzyme systems and a diluent which serves to stabilize the composition against activity degradation or loss of potency at elevated temperatures. One of the enzyme systems used has activity in the reduction or softening of the collagen and elastin which is found in the connective tissue in meats but has little or no activity against muscle fiber. This enzyme system is exemplified by bromelain, an enzyme which is found in plants of tropical origin. The other enzyme system used has an appreciably lesser effect on the collagenous or elastic fibers, but is very active in the reduction or softening of muscle fiber. This enzyme system is selected from the group of proteolytic enzymes of microbial or plant origin, such as the fungal or bacterial proteases, and the like.

The advantage of using a combination of enzyme systems which act on separate and particular portions of the animal tissue represents a substantial advance over prior art formulations.

The diluent material which demonstrates the completely unexpected and surprising stabilizing effect is selected from an artificial group which consists of lactose, maltose, sucrose, and glucose. This class excludes other sugars of similar character. The lack of utility as a stabilizer of other sugars such as fructose and galactose, which is completely surprising and unexpected, is believed to be due to molecular configuration and not to any chemical reactivity. Of the diluent-stabilizers operable, lactose is preferred and is contemplated in the preferred embodiment of this invention.

The meat tenderizer compositions of this invention are prepared by blending together by any convenient means the enzyme systems with the sugar in a dry powder form. The components are adjusted so that there is a balance of activity of the mixture of enzymes to result in the desired activity per unit of the blend. It is preferred that each gram of the final composition have from 8 to 12 units of activity per gram of composition, the potency depending, however, upon the degree of tenderizing activity required. Operable compositions have been prepared by combining sufficient bromelain to furnish, on a potency basis, from 25% to 75% of the total enzyme activity, sufficient fungal protease to supply from 75% to 25% of the total activity, with sufficient lactose to result in a final formulation of the desired potency, that is, from 8 to 12 viscosity units/gram.

Preferably, the enzyme systems are assayed according to the Standard Viscosity Method of Assay as described by R. F. Nickerson in the Journal of American Leather Chemists Association, volume 47, page 165 (1952). Briefly, this method determines the solubilizing effect of a unit quantity of the enzyme on a gelatin solution of standard pH and viscosity. The potency of the enzyme is thus reported in viscosity units per unit quantity. One viscosity unit or unit of activity is defined as that amount of activity which when employed under the conditions described produces a rate of increase of relative fluidity of 1% per second. It is this standard of activity, or potency, by which the compositions of this invention are described.

Set out below in tabular form are experimental data illustrating the surprising and unexpected stability of the enzyme formulations of this invention.

EXPERIMENTAL

In formulating the compositions referred to below, the enzyme systems were assayed in accordance with the Standard Viscometric Assay Method described above. Since a potency of about 0.09 to 0.11 viscosity units per ml. of final solution was required in order to read the potency on the Ostwald-Fenske-Cannon viscosimeter used in the determinations, the amount of each enzyme system required to result in a potency of 0.05 viscosity unit per ml. of solution was calculated based on the assayed potency of each enzyme system. These amounts were then admixed and sufficient diluent-stabilizer was added to give the desired percentage composition.

In the data set out in Table I below, compositions were prepared in which the variant was the diluent-stabilizer. Since sodium chloride or common salt has been widely used as a diluent-stabilizer in the prior art compositions, this material was compared for its stabilizing effect with two examples of the stabilizers of the instant invention. A control was run which contained no stabilizer. The tests were run at 50° C. and samples were withdrawn at intervals of 30 minutes and the Standard Viscometric Assay performed. The results are reported as percent of the original activity of the composition.

*Table I*

| Stabilizer (5%) | Time (min.) | | | |
|---|---|---|---|---|
| | 0 | 30 | 60 | 90 |
| Control | 100 | 79.2 | 51.2 | 43.8 |
| NaCl | 100 | 67.2 | 55.2 | 48.5 |
| Glucose | 100 | 76.3 | 68.0 | 54.1 |
| Lactose | 100 | 88.2 | 79.7 | 73.3 |

An examination of the data of the table above shows the completely unexpected results that are obtained with the compositions of this invention. When stabilized with either glucose or lactose, the enzyme system retains after 60 minutes from 17% to 28% and after 90 minutes from 10% to 30% more activity than the control, and from 13% to 24% and from 6% to 25%, after 60 and 90 minutes respectively, more activity than with the prior art diluent.

Using the same enzyme formulation as described above, several different stabilizing materials were tested in 5% concentrations in stability tests run at 60° C. Again the stability tests were made at time intervals, in these experiments at intervals of 10 minutes. The data are quoted in percent of the original activity remains after the lapse of the time interval.

Table II

[Stability at 60° C. (percent original activity]

| Stabilizer (5%) | Time (min.) | | | |
|---|---|---|---|---|
| | 0 | 10 | 20 | 30 |
| Control | 100 | 37.5 | 29.5 | 25.2 |
| NaCl | 100 | 41.8 | 33.2 | 22.8 |
| Glucose | 100 | 41.3 | 38.5 | 30.6 |
| Sucrose | 100 | 37.5 | 35.7 | 28.0 |
| Maltose | 100 | 44.9 | 34.2 | 25.7 |
| Galactose | 100 | 39.0 | 27.2 | 21.0 |
| Fructose | 100 | 38.1 | 27.1 | 19.8 |
| Lactose | 100 | 54.8 | 36.2 | 33.7 |

In this table there is shown again the unexpected stabilizing effect of the compositions prepared according to the inventive concept. It will be seen that a decided advantage in stability is obtained with all sugars excepting fructose and galactose. The reason for the lack of utility of these sugars is not known, but it is suggested that molecular configuration has some bearing on the ability of the sugar to stabilize the system.

To determine the optimum concentration of the preferred stabilizer, a series of stability tests were run varying the amount of the stabilizer composition. The results reported in percentage of original activity after a stated time interval are set out in Table III below.

Table III

[Stability at 60° C. (percent original activity)]

| Percent lactose | Time (min.) | | | |
|---|---|---|---|---|
| | 0 | 10 | 20 | 30 |
| 0 | 100 | 37.4 | 29.5 | 25.2 |
| 5.0 | 100 | 54.8 | 36.5 | 33.6 |
| 10.0 | 100 | 53.7 | 26.6 | 21.0 |
| 15.0 | 100 | 58.5 | 32.2 | 20.5 |

From the data of Table III above, it appears that the optimum concentration of the stabilizer lies within the range of from about 3.5 to 7.5%, preferably from 4.5 to 5.5%, and the preferred embodiment of this invention so contemplates.

To show the outstanding and surprising stabilizing effect accomplished in accordance with the invention concept, a series of stability tests were performed on compositions containing the separate enzymes of the inventive concept in comparison with the inventive composition in the presence of a uniform amount of the stabilizer. These data, reported in percent of original activity after a stated time interval, are set out in Table IV below.

Table IV

[Stability at 60° C. (percent original activity)]

| System (contains 5% lactose) | Time (min.) | | | |
|---|---|---|---|---|
| | 0 | 10 | 20 | 30 |
| 100% bromelain | 100 | 46.2 | 20.5 | 14.0 |
| 100% fungal protease | 100 | 7.1 | 0 | 0 |
| 50% bromelain, 50% fungal protease | 100 | 54.6 | 36.2 | 33.6 |

The above data reflect the synergistic stabilizing effect of the stabilizers of this invention upon the combination of the two enzyme systems. Whereas the lactose has no stabilizing effect upon the fungal protease system and very little on the bromelain, it has a very profound effect on a combination of both systems.

To illustrate the excellent meat tenderizing effect of the compositions of this invention, a series of field trials of the formulations were carried out as described below.

Commercial grade "bone-in-strip" loin from a "hand-picked cheater," an undesirable beef animal, was used for testing. The loin from this animal was cut into steaks from ¾ to 1 inch in thickness. All steaks were lightly coated with a bland cooking oil just prior to cooking. The broiling equipment, gas fired, was preheated for 15 minutes prior to use.

A solution of the desired amount of a composition according to this invention was prepared by adding the composition to tap water and stirring. Steaks were completely immersed in the solution for approximately 2 minutes, drained for approximately 5 minutes, and either frozen or cooked immediately at a uniform temperature.

The composition used had the following formulation:

| | |
|---|---|
| Bromelain | gm__ 5.2 |
| Fungal protease | gm__ 48.2 |
| Lactose | gm__ 853.6 |
| Total | gm__ 907.0 |
| Potency | V.U./gm__ 861 |
| Potency | V.U./gm__ 94.3 |
| Viscosity units | V.U./gm__ 9.9 |

Table V

[In this series of tests steaks were treated as described above and cooked immediately]

| Amount of tenderizer per gallon of water | Cooking time | | Results |
|---|---|---|---|
| | At— | °F. | |
| None | 7'30" | 450 | Tough—undesirable. |
| 0.5 oz | 7'30" | 450 | Good caramelization, good taste, significantly more tender than control. |
| 1.0 oz | 7'30" | 450 | Good caramelization, perfect color, perfect taste, excellent tenderness. |
| 1.5 oz | 7'30" | 450 | Overall excellence, more tender than above with no mushiness. |

Table VI

[In this series of tests steaks were treated as described above, frozen, and stored for 30 days prior to cooking]

| Amount of tenderizer per gallon of water | Cooking time | | Results |
|---|---|---|---|
| | At— | °F. | |
| None | 11'30" | 450 | Tough—undesirable. |
| 0.5 oz | 11'30" | 450 | Good caramelization, good taste, significantly more tender than control. |
| 1.0 oz | 11'30" | 450 | Good caramelization, perfect color, perfect taste, excellent tenderness. |
| 1.5 oz | 11'30" | 450 | Overall excellence, more tender than above with no mushiness. |

Table VII

[In this series of tests steaks were treated as described above, frozen, and stored for 60 days prior to cooking]

| Amount of tenderizer per gallon of water | Cooking time | | Results |
|---|---|---|---|
| | At— | °F. | |
| None | 11'30" | 450 | Tough—undesirable. |
| 0.5 oz | 11'30" | 450 | Good caramelization, good taste, significantly more tender than control. |
| 1.0 oz | 11'30" | 450 | Good caramelization, perfect color, perfect taste, excellent tenderness. |
| 1.5 oz | 11'30" | 450 | Overall excellence, more tender than above with no mushiness. |

To summarize briefly, this invention relates to meat tenderizing compositions showing unexpected utility and stability which comprise mixtures of two or more enzyme systems having particular activity toward different animal tissue fibers stabilized by a diluent selected from the group consisting of lactose, maltose, sucrose, and glucose. The preferred embodiment of the invention comprises formulations of sufficient bromelain to furnish, on a potency basis, from 25% to 75% of the total enzyme activity, sufficient fungal protease to supply from 75% to 25% of the total activity, and sufficient lactose to result in a final formulation of from 8 to 12 Viscosity Units per gram, said percentage being of the total enzyme activity as assayed by the Standard Viscometric Assay Method.

What is claimed is:

1. A meat tenderizing composition which comprises in combination sufficient of an enzyme system having collagenase and elastase activity to furnish, on a potency basis, from 25% to 75% of the total enzyme activity, sufficient of an enzyme system having destructive activity on muscle fiber to supply from 75% to 25% of the total enzyme activity, and a diluent selected from the group consisting of lactose, glucose, maltose, and sucrose, said diluent serving to stabilize said enzyme systems against loss of activity due to elevated temperatures.

2. A meat tenderizing composition which comprises in combination sufficient bromelain to furnish, on a potency basis, from 25% to 75% of the total enzyme activity, sufficient fungal protease to supply from 75% to 25% of the total activity, and sufficient diluent selected from the group consisting of lactose, glucose, maltose and sucrose to result in a final composition having a potency of from 8 to 12 viscosity units per gram, said percentage being of the total enzyme activity as assayed by the Standard Viscometric Assay method.

3. A meat tenderizing composition according to claim 2 wherein said diluent is lactose.

4. A meat tenderizing composition according to claim 2 wherein said diluent is glucose.

5. A meat tenderizing composition according to claim 2 wherein said diluent is maltose.

6. A meat tenderizing composition according to claim 2 wherein said diluent is sucrose.

7. A meat tenderizing composition comprising the following formulation:

Bromelain _____ 5.2 gm. of 861 V.U./gm. potency.
Fungal protease __ 48.2 gm. of 94.3 V.U./gm. potency.
Lactose _____ 853.6 gm.

References Cited in the file of this patent

UNITED STATES PATENTS

| | | |
|---|---|---|
| 2,140,781 | Allen _____ | Dec. 20, 1938 |
| 2,321,623 | Ramsbottom et al. _____ | June 15, 1943 |
| 2,471,282 | Paddock _____ | May 24, 1949 |
| 2,805,163 | Williams et al. _____ | Sept. 3, 1957 |
| 2,825,654 | Vaupel _____ | Mar. 4, 1958 |